United States Patent Office 3,210,248
Patented Oct. 5, 1965

3,210,248
EMOLLIENT GEL COMPRISING LANOLIN ALCOHOL, MICROCRYSTALLINE WAX AND A LIQUID FATTY ACID ESTER
Robert J. Feldmann, San Francisco, Calif., and Thomas J. Macek, Jenkintown, Clyde E. Shoop, Lansdale, and Irwin D. Pincus, Philadelphia, Pa., assignors to Merck & Co., Inc., Rahway, N.J., a corporation of New Jersey
No Drawing. Filed Sept. 4, 1963, Ser. No. 306,609
8 Claims. (Cl. 167—63)

This application is a continuation-in-part of our copending application of Serial Number 283,991, filed on May 29, 1963.

This invention relates to an emollient composition containing a liquid fatty acid ester, and to a process for its manufacture. More particularly, this invention relates to an emollient composition in the form of a homogeneous ointment consisting essentially of lanolin alcohols, microcrystalline white wax, and a liquid fatty acid ester, and in particular isopropyl myristate or isopropyl palmitate. An object of this invention is to form a stable preparation for topical application, which incorporates a large percentage of a liquid ingredient such as a liquid fatty acid ester such as isopropyl myristate. A similar problem applies in connection with isopropyl palmitate and other liquid fatty acid esters.

Although the skin penetrating properties of isopropyl myristate are known, this compound has heretofore primarily been utilized in either a cream or a lotion, both of which tend to dry out. The ointment containing isopropyl myristate or other liquid fatty acid esters prepared in accordance with this invention has great advantage in that the anhydrous gel form possesses very desirable dermatologic properties. The gel is non-drying to the skin, leaves the skin soft and pliable even where there is dryness and scaling, and in addition it spreads easily and unlike other ointments can be applied to certain moist lesions. Thus, this one preparation has application in a broader variety of dermatologic lesions and is therefore useful and worthwhile.

Another object of this invention is to provide an ointment of this type, having exceedingly good penetration properties and which can be combined with medication of various forms and carries the medication with it in performing its penetrating function, but which does not dry up as do cream and lotions.

In accordance with this invention it has been discovered that a gel of liquid fatty acid esters may be formed by the synergistic effect of lanolin alcohols and microcrystalline white wax having a melting point between about 60 to 90° C. but preferably from about 75–80° C. In accordance with this invention, the liquid fatty esters, lanolin alcohols and microcrystalline white wax are heated together to about 80°–85° C. and then cooled to about 45°–50° C. forming a gelled product. In this manner, a stable preparation is formed incorporating a large percentage (as much as 50–55% by weight) of the liquid fatty acid ester ingredient.

Preferably in accordance with this invention the composition consists essentially of a homogeneous gel of from about 20 to about 40% by weight of lanolin alcohols B.P., from about 10 to about 25% by weight of a microcrystalline white wax, and from about 35–55% by weight of the liquid fatty acid ester.

The lanolin alcohols referred to herein are known commercially as Super Hartolan and consist of lanolin or wool alcohols British Pharmacopoeia (B.P.) This product is prepared by saponification of the grease of the wool of sheep, and separation of the fraction containing cholesterol and other alcohols. It contains not less than 28% by weight of cholesterol. Other lanolin alcohols and other substances suitable for use in the preparation of the emollient compositions are:

Cholesterol stearate,
Amerchol L-101 (American Cholesterol Products, Inc., Edison, New Jersey), extract of lanolin alcohols,
Amerchol CAB (American Cholesterol), free forms of sterols and higher alcohols of lanolin,
Amerchol H-9 (American Cholesterol), free forms of sterols, cholesterol, and esters,
Span 40 (Atlas Chemical Company, Wilmington, Delaware), sorbitan monopalmitate,
Span 60 (Atlas), sorbitan monostearate,
Waxolan (American Cholesterol), waxy fractions of lanolin,
Amerchol C (American Cholesterol), free forms of sterols, higher alcohols of lanolin, and cholesterol esters,
Amerchol BL (American Cholesterol), extract of lanolin alcohols and cholesterol esters,
Etolan 40 (Croda Inc., New York, N.Y.), lanolin alcohols with 40 mols. ethylene oxide,
Solan (Croda, Inc.), lanolin alcohols with 65–70 mols. ethylene oxide.

The microcrystalline white wax referred to herein is commercially known as B Square White Wax, which is paraffin but has a slightly higher melting range than defined by the U.S. Pharmacopoeia. It is a mixture of hydrocarbons obtained from petroleum. It has been found that while the texture of the emollient becomes more firm as the melting point of the wax used increases from a low of about 60° C. to a high of about 90° C., yet the final product retains the desirable property of easy spreadability.

Among the liquid fatty acid esters especially suitable are isopropyl myristate and isopropyl palmitate which are well known per se. Suitable isopropyl myristate specifications are as follows:

| | |
|---|---|
| Color, A.P.H.A., maximum | 35 |
| Odor | Practically none |
| Saponification value | 204–212 |
| Acid value, maximum | 1.0 |
| Iodine value, maximum | 1.0 |
| Sp. gr. at 25°/15° C. | 0.852±0.003 |
| Viscosity at 25° C. cp | 4.8 |
| Refractive index at 25° C. | 1.433 |
| Freezing point °C | −3 |
| Boiling point at 4 mm. °C | 162.5 |
| Flash point (open cup) °F | 305 |

Other liquid fatty acid esters which have been found to be useful in preparing the emollient compositions are:

Isopropyl stearate
Isopropyl palmitate
Butyl stearate
Butyl oleate
Butyl myristate
Propyl oleate
Diglycol laurate
Propylene glycol monolaurate
Glyceryl monooleate O A preferred composition in accordance with this invention consists essentially of 20% by weight of lanolin or wool alcohols B.P., 25% by weight B Square White Wax and the balance isopropyl myristate or isopropyl palmitate. A firmer base is produced with 30 to 40% by weight of lanolin or wool alcohols B.P. and 0 to 25% by weight of microcrystalline white wax. Conversely, a softer base is produced with 20% by weight of lanolin or wool alcohols B.P. and 15% by weight of microcrystalline white wax. If the microcrysalline white wax is omitted entirely the product is not satisfactory, the mixture is grainy in appearance, becomes non-homogeneous on standing, and is not emollient.

Compositions prepared in accordance with this invention do not separate after several weeks storage at 37° C., are easy to prepare, and show no local irritation on the human skin. Moreover, they do not become excessively firm on aging with resultant poor spreadability.

*Example 1*

Forty parts by weight of lanolin alcohols B.P. (Super Hartolan-Croda), 10 parts by weight of microcrystalline white wax (M.P. 75°–80° C.), and 50 parts by weight of isopropyl myristate were heated together to 80° C. The heated mixture was agitated with an electric stirrer. During this agitaation the mixture was cooled gradually until at 45° C., a firm homogeneous gel was formed which was easily spread. This gel was stored at 37° C. for 5 weeks, at the end of which time the gel was still homogeneous and showed no separation. This gel was also stored at 5° C. for a period of 12 months, at the end of which the product was very firm, but which returned to its original physical state on warming to 22°–23° C.

*Example 2*

Twenty parts by weight of lanolin alcohols B.P. (Super Hartolan-Croda), 25 parts by weight of microcrystalline white wax (M.P. 75°–80° C.), and 55 parts by weight of isopuropyl myristate were heated together to 85° C. The heated mixture was agitated with an electric stirrer. During this agitation the mixture was cooled gradually until at 50° C. a soft homogeneous gel was formed, which was easily spread. This gel was stored at 37° C. for 6 weeks, at the end of which time the gel was still homogeneous and showed no separation. Ths gel was also stored at 5° C. for a period of 12 months, at the end of which the product was very firm, but which returned to its original physical state on warming up at 22°–23° C.

Prior to the discovery of the novel composition of this invention, futile attempts had been made toward obtaining a sable emollient gel of isopropyl myristate. It was not possible to form a stable product using polyethylene in amounts in the range of from about 20 to about 25% by weight. In this case the base was difficult to prepare, separated after several weeks storage at 37° C., and showed mild local irritation on the human skin. Microcrystalline white wax (M.P. 75°–80° C.) alone gelled the isopropyl myristate when added on an equal part basis, yielding a rather firm product which was difficult to spread.

The product of Example 2 was employed as a base for incorporating various medicinal agents as follows:

| Medicinial agent: | Percent by weight |
|---|---|
| 1. Coal tar USP | 5 |
| Tween 80 (polyoxyethylene[20]sorbitan monooleate) | 0.5 |
| 2. Boric acid USP | 10 |
| 3. Iodine USP | 4 |
| 4. Potassium iodide | 4 |
| Glycerin | 12 |
| 5. Phenol | 2 |
| 6. Sulfathiazole | 5 |
| 7. Zinc oxide | 20 |
| Mineral oil | 15 |
| 8. Yellow mercuric oxide | 1 |
| 9. Mild mercurous chloride | 30 |
| 10. Mercury bichloride | 0.03 |
| 11. Precipitated sulfur | 10 |
| Mineral oil | 10 |
| 12. Corn starch | 30 |
| 13. Zinc oxide | 25 |
| Corn starch | 25 |
| 14. Aluminum | 10 |
| 15. Mineral oil | 15 |
| 16. Zinc oxide | 20 |

The products remained homogeneous on storage at 22°–23° C. They softened, but showed no separation at 37° C. and again became firm on equilibrating at 22°–23° C.

It is possible to incorporate water into the bases described in Examples 1 and 2 without adversely affecting the stable product by adding water per se to the gelled base, or by adding water as an ingredient during the manufacture of the base.

The following examples show stable gel emollient products which have been prepared utilizing the novel composition of this invention:

*Example 3*

| Ingredient | Percent by weight of total composition |
|---|---|
| Etruscomycin (activity) | 0.4 |
| Citric acid, anhydrous | 0.372 |
| Dibasic sodium phosphate, anhydrous | 0.586 |
| Microcrystalline white wax (M.P. 75°–80° C.) | 10.0 |
| Lanolin alcohols B.P. (Super Hartolan-Croda) | 40.0 |
| Isopropyl myristate | 48.5 |

*Example 4*

| Ingredient: | Percent by weight of total composition |
|---|---|
| Dexamethasone | 0.1 |
| Citric acid, anhydrous | 0.372 |
| Dibasic sodium phosphate, anhydrous | 0.586 |
| Microcrystalline white wax (M.P. 75°–80° C.) | 10.0 |
| Lanolin alcohols B.P. (Super Hartolan-Croda) | 40.0 |
| Isopropyl myristate | 48.942 |

*Example 5*

| Ingredient: | Percent by weight of total composition |
|---|---|
| Dexamethasone | 0.1 |
| Neomycin sulfate | 0.5 |
| Citric acid, anhydrous | 0.372 |
| Dibasic sodium phosphate, anhydrous | 0.586 |
| Microcrystalline white wax (M.P. 75°–80° C.) | 10.0 |
| Lanolin alcohols B.P. (Super Hartolan-Croda) | 40.0 |
| Isopropyl palmitate | 48.442 |

*Example 6*

| Ingredient: | Percent by weight of total composition |
|---|---|
| Dexamethasone | 0.1 |
| Citric acid, anhydrous | 0.372 |
| Dibasic sodium phosphate, anhydrous | 0.586 |
| Microcrystalline white wax (M.P. 75°–80° C.) | 20 |
| Lanolin alcohols B.P. (Super Hartolan-Croda) | 20 |
| Isopropyl myristate | 54 |

Compositions equivalent to that described in Example 6 can be prepared by using the same percentage by weight of all of the ingredients called for except the amount of isopropyl myristate is decreased to 49% and then in each composition 25% of the products identified below is substituted for the Super Hartolan-Croda:

| | |
|---|---|
| Example 6a | Span 40. |
| Example 6b | Span 60. |
| Example 6c | Waxolan. |
| Example 6d | Amerchol C. |
| Example 6e | Amerchol BL. |
| Example 6f | Etolan 40. |
| Example 6g | Solan. |

Similarly, by replacing the isopropyl myristate ingredient in Example 6 composition by an equal percentage of the following liquid fatty acid esters and using the same percentages of the other materials identified in Example 6, equivalent compositions are prepared:

Example 6h_____ Isopropyl stearate.
Example 6i_____ Isopropyl palmitate.
Example 6j_____ Butyl stearate.
Example 6k_____ Butyl oleate.
Example 6l_____ Butyl myristate.
Example 6m_____ Propyl oleate.
Example 6n_____ Diglycol laurate.
Example 6o_____ Propylene glycol monolaurate.
Example 6p_____ Glyceryl monooleate.

In like manner, the emollient composition of Example 6 can be modified by replacing the wax used there by an equal amount of lower or higher melting waxes, especially the following:

Example 6q, microcrystalline white wax, M.P. 63–65° C. _____ A softer gel is formed than is obtained by Ex. 6 composition.

Example 6r, microcrystalline white wax, M.P. 87–90° C. _____ A firmer gel is formed than is obtained by Ex. 6 composition.

*Example 7*

| Ingredient: | Percent by weight of total composition |
|---|---|
| Dexamethasone | 1.0 |
| Citric acid, anhydrous | 0.372 |
| Dibasic sodium phosphate | 0.586 |
| Microcrystalline white wax (M.P. 75°–80° C.) | 25.0 |
| Lanolin alcohols B.P. (Super Hartolan-Croda) | 20.0 |
| Isopropyl palmitate | 53.1 |

The composition described in Example 7 can be prepared employing an equal percentage of other lanolin alcohols in place of the Super Hartolan-Croda there used. Thus by using the ingredients of Example 7 in the same percentage by weight set forth there, and then replacing in each composition the Super Hartolan-Croda by 20% by weight of one of the following lanolin alcohols, equivalent compositions are prepared:

Example 7a_____ Cholesteryl stearate.
Example 7b_____ Amerchol L–101.
Example 7c_____ Amerchol CAB.
Example 7d_____ Amerchol H–9.

*Example 8*

| Ingredient: | Percent by weight of total composition |
|---|---|
| Dexamethasone | 0.1 |
| Neomycin sulfate | 0.5 |
| Citric acid, anhydrous | 0.372 |
| Dibasic sodium phosphate, anhydrous | 0.586 |
| Microcrystalline white wax (M.P. 75°–80° C.) | 25.0 |
| Lanolin alcohols B.P. (Super Hartolan-Croda) | 20.0 |
| Isopropyl myristate | 53.5 |

*Example 9*

| Ingredient: | Percent by weight of total composition |
|---|---|
| Allodihydrohydrocortisone | 0.5–5.0 |
| Citric acid | 0.372 |
| Dibasic sodium phosphate | 0.586 |
| Lanolin alcohols (Super Hartalan) | 20.0 |
| Microcrystalline wax (B Square White Wax) | 25.0 |
| Isopropyl myristate, to make | 100.0 |

*Example 10*

| Ingredient: | Percent by weight of total composition |
|---|---|
| Mycostatin [1] | |
| Citric acid, anhydrous | 0.372 |
| Dibasic sodium phosphate, anhydrous | 0.586 |
| Microcrystalline white wax (M.P. 75°–80° C.) | 25.0 |
| Lanolin alcohols B.P. (Super Hartolan-Croda) | 25.0 |
| Isopropyl palmitate | 46.0 |

[1] 100,000 units.

*Example 11*

| Ingredient: | Percent by weight of total composition |
|---|---|
| Mycostatin [1] | |
| Citric acid, anhydrous | 0.372 |
| Dibasic sodium phosphate, anhydrous | 0.586 |
| Microcrystalline white wax (M.P. 75°–80° C.) | 25.0 |
| Lanolin alcohols B.P. (Super Hartolan-Croda) | 25.0 |
| Isopropyl myristate | 45.9 |

[1] 100,000 units.

*Example 12*

| Ingredient: | Percent by weight of total composition |
|---|---|
| Mycostatin [1] | |
| Citric acid, anhydrous | 0.372 |
| Dibasic sodium phosphate, anhydrous | 0.586 |
| Microcrystalline white wax (M.P. 75°–80° C.) | 25.0 |
| Lanolin alcohols B.P. (Super Hartolan-Croda) | 25.0 |
| Isopropyl palmitate | 45.4 |
| Dexamethasone | 0.1 |
| Neomycin sulfate | 0.5 |

[1] 100,000 units.

*Example 13*

Three hundred parts by weight of water are incorporated into a portion of the product of Example 2 to give a stable product having the following composition:

| Ingredient: | Percent by weight of total composition |
|---|---|
| Water | 300 |
| Microcrystalline white wax (M.P. 75°–80° C.) | 25 |
| Lanolin alcohols B.P. (Super Hartolan-Croda) | 25 |
| Isopropyl myristate | 55 |

*Example 14*

20 parts by weight of lanolin alcohols B.P. (Super Hartolan-Croda) was heated gradually while adding 600 parts by weight of water of 80° C. using mechanical agitation to incorporate the water. Separately 25 parts by weight of microcrystalline white wax (M.P. 75°–80° C.) and 55 parts by weight of isopropyl myristate were heated together to 80° C. and blended with the water mixture using mechanical agitation. While continuing the agitation, the temperature of the combined portions was cooled to 48° C.

The following stable topical cream has been prepared utilizing the novel gel composition of this invention as a base:

TOPICAL CREAM

| Ingredient: | Percent by weight of total composition |
|---|---|
| Dexamethasone | 0.1 |
| Neomycin sulfate | 0.5 |

| Ingredient | Percent by weight of total composition |
|---|---|
| Antifoam AF emulsion [1] | 0.05 |
| Citric acid, anhydrous | 0.3 |
| Dibasic sodium phosphate | 0.6 |
| Sodium bisulfite | 0.25 |
| Disodium sequestrene (disodium salt of ethylene-diaminetetraacetic acid) | 0.1 |
| Methylparaben | 0.12 |
| Propylparaben | 0.02 |
| Isopropyl myristate | 30.0 |
| Lanolin alcohols B.P. (Super Hartolan-Croda) | 3.0 |
| Non-ionic emulsifying wax (Polawax-Croda) | 12.0 |
| Oleyl alcohol with 3 mols ethylene oxide (Novol POE 3-Croda) | 3.5 |
| Cetyl alcohol | 5.0 |
| Distilled water, q.s. | 100.0 |

[1] A water dilutable dispersion of 30% Antifoam A, an organo silicone oxide polymer, obtainable from Dow-Corning Corp., Midland, Mich.

The following stable topical lotion has been prepared utilizing the novel gel composition of this invention as a base:

*Example 15.—Topical lotion*

| Ingredient: | Percent by weight of total composition |
|---|---|
| Dexamethasone | 0.1 |
| Neomycin sulfate | 0.5 |
| Antifoam AF emulsion | 0.05 |
| Citric acid, anhydrous | 0.2 |
| Dibasic sodium phosphate | 0.6 |
| Sodium bisulfite | 0.25 |
| Disodium sequestrene | 0.1 |
| Methylparaben | 0.12 |
| Propylparaben | 0.02 |
| Isopropyl myristate | 25.0 |
| Lanolin alcohols B.P. (Super Hartolan-Croda) | 12.0 |
| Cetyl alcohol | 2.0 |
| Lanolin alcohols B.P. with 40 mols ethylene oxide (Polychol 40-Croda) | 7.0 |
| Distilled water, q.s. | 100.0 |

It will be appreciated that while specific compounds have been referred to herein for clarity of illustration, various equivalent compounds may be substituted. For example, where the expression "lanolin alcohols B.P." is used, it will be appreciated that the equivalent extracts of sheep wool, all containing substantial quantities of cholesterol or any of the other lanolin alcohols mentioned above may be substituted therefor. Similarly, other equivalent compounds may be substituted for the other ingredients referred to in the compositions set forth in the specification and in the examples. All such modifications are intended to be included within the scope of this invention as defined in the appended claims.

What is claimed is:

1. A stable emollient consisting essentially of a gel of from about 20 to about 40% by weight of a substance selected from the group consisting of a lanolin alcohol, sorbitan monopalmitate and sorbitan monostearate, from about 20 to about 40% by weight of a microcrystalline white wax having a melting point between about 60 to about 90° C., and from about 35 to about 55% by weight of a liquid fatty acid ester.

2. A stable emollient consisting essentially of a gel of from about 20 to about 40% by weight of lanolin alcohols B.P., from about 10 to about 25% by weight of microcrystalline white wax, M.P. between 60–90° C. and about 35–55% by weight of a compound selected from the group consisting of isopropyl myristate, isopropyl palmitate, isopropyl stearate, butyl stearate, butyl oleate, butyl myristate, propyl oleate, diglycol laurate, propylene glycol monolaurate and glyceryl monooleate.

3. A stable emollient consisting essentially of a gel of from about 20 to about 40% by weight of lanolin alcohols B.P., from about 10 to about 25% by weight of microcrystalline white wax, M.P. between 60–90° C., and about 35–55% by weight of isopropyl myristate.

4. A stable emollient consisting essentially of a gel of from about 20 to about 40% by weight of lanolin alcohols B.P., from about 10 to about 25% by weight of microcrystalline white wax, M.P. between 60–90° C. and about 35–55% by weight of isopropyl palmitate.

5. An emollient composition consisting essentially of about 0.1–1.0% by weight of dexamethasone in a base comprising a homogeneous gel consisting essentially of about 20–40% by weight of lanolin alcohols B.P., from about 10 to about 25% by weight of microcrystalline white wax, M.P. between about 60 to about 90° C., and about 35–55% by weight of a compound selected from the group consisting of isopropyl myristate and isopropyl palmitate.

6. An emollient composition consisting essentially of about 0.5–5.0% by weight of allodihydrohydrocortisone in a base comprising a homogeneous gel consisting essentially of about 20–40% by weight of lanolin alcohols B.P., from about 10 to about 25% by weight of microcrystalline white wax, M.P. between about 60 to about 90° C., and about 35–55% by weight of a compound selected from the group consisting of isopropyl myristate and isopropyl palmitate.

7. A stable emollient consisting essentially of a gel of about 20% by weight of lanolin alcohols B.P., of about 25% by weight of microcrystalline white wax, M.P. 75–80° C. and about 55% by weight of a compound selected from the group consisting of isopropyl myristate and isopropyl palmitate.

8. A process of producing a stable homogeneous gel of lanolin alcohols B.P., a microcrystalline wax and a liquid fatty acid ester comprising the steps of (1) heating together to a temperature in the range of from about 80° C. to about 85° C., from about 20 to about 30 parts by weight of lanolin alcohols B.P., from about 15 to about 25 parts by weight of a microcrystalline white wax having a M.P. between about 60 to about 90° C. and at least about 50 parts by weight of a liquid fatty acid ester; (2) cooling the heated mixture formed in step (1) with simultaneous mechanical agitation of said mixture until a gel is formed.

References Cited by the Examiner

Barnett, "Drug and Cosmetic Industry," vol. 80, No. 6, June 1957, pp. 774–745 and 845–853; pp. 847–848 especially relied on.

JULIAN S. LEVITT, *Primary Examiner.*

UNITED STATES PATENT OFFICE
CERTIFICATE OF CORRECTION

Patent No. 3,210,248                          October 5, 1965

Robert J. Feldmann et al.

It is hereby certified that error appears in the above numbered patent requiring correction and that the said Letters Patent should read as corrected below.

Column 1, line 53, for "liquid fatty esters," read -- liquid fatty acid ester, --; column 2, line 67, for "0 to 25%" read -- 10 to 25% --; column 6, line 53, for "25" read -- 20 --; line 59, for "of", second occurrence, read -- to --.

Signed and sealed this 18th day of October 1966.

(SEAL)
Attest:

ERNEST W. SWIDER                                  EDWARD J. BRENNER
Attesting Officer                                       Commissioner of Patents

UNITED STATES PATENT OFFICE
CERTIFICATE OF CORRECTION

Patent No. 3,210,248                October 5, 1965

Robert J. Feldmann et al.

It is hereby certified that error appears in the above numbered patent requiring correction and that the said Letters Patent should read as corrected below.

Column 1, line 53, for "liquid fatty esters," read -- liquid fatty acid ester, --; column 2, line 67, for "0 to 25%" read -- 10 to 25% --; column 6, line 53, for "25" read -- 20 --; line 59, for "of", second occurrence, read -- to --.

Signed and sealed this 18th day of October 1966.

(SEAL)
Attest:

ERNEST W. SWIDER                EDWARD J. BRENNER
Attesting Officer                Commissioner of Patents